Dec. 19, 1961     A. F. KOPASKA     3,013,373
MOWING MACHINE CUTTER BLADE
Filed Aug. 15, 1958

INVENTOR.
ARNOLD F. KOPASKA
BY
Lowell & Henderson
ATTORNEYS

United States Patent Office 3,013,373
Patented Dec. 19, 1961

3,013,373
MOWING MACHINE CUTTER BLADE
Arnold F. Kopaska, R.F.D. 4, Guthrie Center, Iowa
Filed Aug. 15, 1958, Ser. No. 755,192
2 Claims. (Cl. 56—298)

This invention relates generally to a mower machine of the reciprocating sickle type, and in particular to an improved cutter blade for use with a mower apparatus.

The mower machine with which this invention is concerned is of a type wherein the outer ground engaging shoe unit is formed with an opening through which the sickle bar is reciprocally movable during a mowing operation. As a result of such reciprocal movement, the material being cut tends to accumulate on the sickle bar, inwardly from the shoe unit whereby to decrease the effective cutting length of the mower bar. This accumulation of the cut material is greatly accelerated when the material is wet or moist.

It is apparent, therefore, that appreciable time is lost by such clogging or accumulation of material at the outer shoe unit. As a mowing operation of this type is usually a one man job, it is necessary for the operator to halt the tractor, climb down, go out to the far end of the cutter bar mechanism, clear away the accumulated material, and then return to the tractor. Depending upon the type of material being cut, these mowing stops may take place several hundred feet apart, or less. In any event, such mowing stops are not only frequent but exasperating to the tractor operator. In many instances the operator attempts to clear the cutter bar while the mowing operation is in progress so as to increase the normal hazards.

It is, therefore, an object of this invention to provide an improved mower machine of the reciprocating sickle type.

Another object of this invention is to provide a mower machine having a conventional cutter bar assembly with a novel cutter blade arrangement for preventing the formation of wads or accumulations of cut material at the outer shoe of the assembly.

A still further object of this invention is to provide a mower machine having an outer shoe unit with an opening formed therein through which a sickle blade assembly reciprocates, wherein a novel cutter blade is arranged for reciprocation through the opening, whereby to prevent the accumulation of any cut material in or about the opening.

Another object of this invention is to provide an improved cutter blade for original assembly with or for subsequent attachment to a conventional mower machine cutter blade assembly.

These objects and other advantages will become apparent from reference to the following description when taken in conjunction with the accompanying drawing, wherein.

Figure 1:
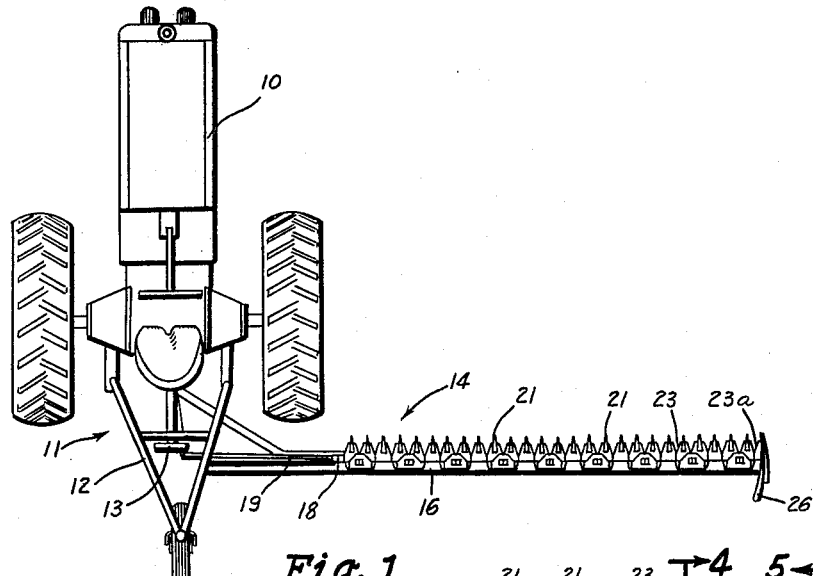
FIG. 1 is a top plan view of a mower machine assembled to a tractor.

Referring to the drawing, there is illustrated in FIG. 1 a conventional farm tractor 10 and a mowing machine indicated generally at 11 embodying the cutter blade of this invention. The mowing machine includes a portable framework 12 connected to the tractor and having a driving mechanism 13 operatively connected to the rear power take off (not shown) of the tractor. A cutter bar assembly 14 is mounted to the frame 12, and although not shown in detail, the arrangement is such that the assembly 14 may be swung from a horizontal to a vertical position.

Figure 3:
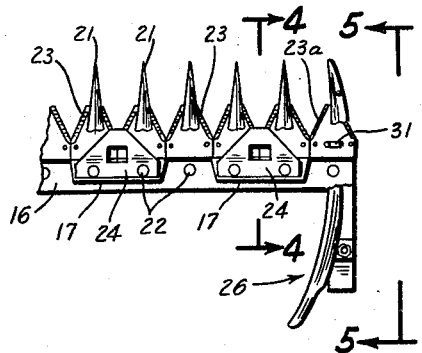
FIG. 3 is an enlarged, fragmentary top plan view of a section of the cutter bar assembly at the outer shoe end thereof, embodying the cutter blade of this invention, and with parts broken away for the purpose of clarity.
Figure 4:
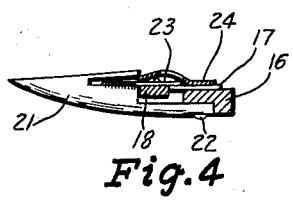
FIG. 4 is an enlarged sectional view taken along the line 4—4 in FIG. 3.

The cutter bar assembly 14 includes the conventional long finger or cutter bar 16 secured at one end to the frame 12 and to which a plurality of spaced wear plates 17 (FIGS. 3 and 4) are secured. A sickle or blade bar 18 is attached via a connecting rod 19 to the driving mechanism 13 for reciprocation against the wear plates 17.

Figure 2:
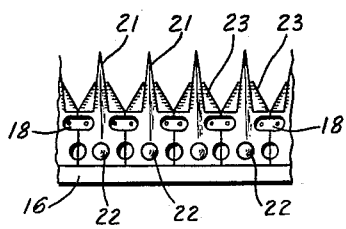
FIG. 2 is an enlarged fragmentary bottom plan view of a section of the cutter bar assembly.

The usual forwardly projected finger guard shoes 21 (FIGS. 2 and 4) are each secured to the cutter bar 16 in a side-by-side relation by a bolt 22, and a plurality of forwardly projecting cutter blades 23 are riveted to the blade bar 18 for reciprocation across the guard shoes 21. Also secured to the cutter bar 16 over each wear plate 17 are a plurality of guide plates 24 (FIGS. 3 and 4) utilized to maintain the blade bar 18 in position. Of note, the bolts 22 are utilized also to secure the wear plates 17 and the guide plates 24 to the cutter bar 16.

Figure 5:
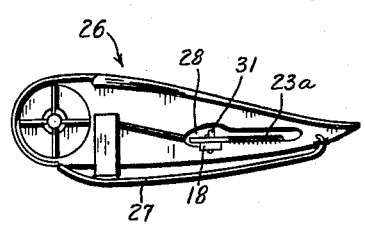
FIG. 5 is an enlarged side elevational view as seen from the line 5—5 in FIG. 3.

At the outer end of the cutter bar 16, a conventional shoe unit 26 is mounted thereto, the unit having a curved runner 27 (FIG. 5) for ground engagement. As noted in FIG. 5, the shoe unit 26 is provided with an opening 28 through which the blade bar 18 and associated parts extend. By this arrangement, the reciprocating blade bar 18 is adapted to carry the outermost cutter 23a back and forth through the opening 28.

As is well known to those in this field, the type of cutting provided by a conventional mower machine 11 as has been described hereinbefore is of a reciprocal nature. The result is that grass or like material which has been cut has an initial tendency during operation of the mower machine to remain on top of the cutter bar mechanism until moved off by later cut grass due to the advance of the mower machine.

At the shoe unit opening 28, this tendency of the cut grass to remain on top of the mechanism is further abetted by grass catching within the opening and remaining there. This results further in other grass catching and hanging on to that already caught until such time that the accumulation builds back toward the tractor and on top of the mechanism to such an extent as to decrease substantially the effective cutting length of the mechanism 14.

Figure 6:
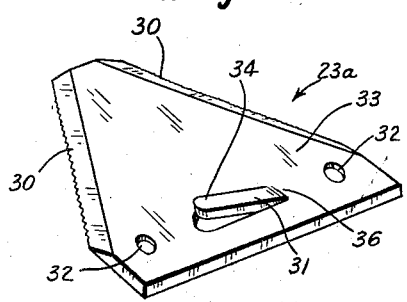
FIG. 6 is an enlarged perspective view of the improved cutter blade of this invention.

To prevent such accumulation, the outer cutter blade 23a (FIG. 6) is provided, in addition to the usual angularly inclined serrated cutting edges 30, with an upwardly extending projection or finger 31 intermediate the rivet holes 32 in the blade. In the disclosed embodiment, the finger 31 is punched out of the blade 23a, is relatively straight and inclined upwardly from the upper surface or top side 33 of the blade. By this arrangement, the inner upper end 34 of the finger 31, spaced above the surface 33, points toward the tractor end of the cutter bar mechanism 14 when the blade 23a is assembled. Of note, other than the finger 31, the blade 23a is conventional so that the blade 23a may be either installed originally as a part of the mechanism, or it may be substituted for the original blade and attached in the field.

In operation, during which time the cutter blade 23a reciprocates back and forth through the opening 28, the cut grass on top of the mechanism 14 which tends to catch in the opening is met, caught, and ejected away from the opening by the reciprocating finger 31. To vary the effective action of the finger, by merely bending the finger upwardly or downwardly about its junction 36 with the body of the blade 23a, the height of the upper end 34 above the surface 33 may be varied.

In summary, an improved cutter blade is provided for use with a cutter blade mechanism which extends through an opening in an outer shoe unit, whereby the accumulation of that which is being cut in and about the opening is prevented. This improvement thus adds to the efficiency of the mower machine by preventing the reduction of the effective cutting length of the cutter bar assembly 14. Additionally, the improved cutter blade improves the safety of operation of the machine by reducing the number of times the operator has to stop and demount from the tractor.

Although a preferred embodiment of the invention has been disclosed herein, it is to be remembered that various alterations and modifications may be made without varying from the full intended scope of the invention as defined by the appended claims.

I claim:

1. In a mower machine including a reciprocating blade bar and an outer ground engaging shoe unit having an opening through which the outer end of said blade bar reciprocates, means for preventing the accumulation of cut material in and about said opening comprising a cutter blade secured to said blade bar and reciprocally movable through said opening, said cutter blade being integrally formed with an elongated transversely extended projection, located within the peripheral confines of said cutter blade, and inclined upwardly from said cutter blade in a direction toward the inner end of said blade bar, said projection being movable through a central portion of said opening to eject cut material from said opening.

2. In a mower machine including a reciprocating blade bar and an outer ground engaging shoe unit having an opening through which the outer end of said blade bar reciprocates, means for preventing the accumulation of cut material in and about said opening comprising a cutter blade secured to said blade bar and reciprocally movable through said opening, an elongated flat projection extended transversely of said cutter blade and movable therewith through a central portion of said opening, said projection being formed from said cutter blade, with one end thereof attached to said cutter blade, and inclined upwardly from said one end in a direction toward the inner end of said blade bar whereby to eject cut material from said opening on to said blade bar.

References Cited in the file of this patent

UNITED STATES PATENTS

| | | |
|---|---|---|
| 13,330 | Urmy | July 24, 1855 |
| 18,659 | Fountain | Nov. 17, 1857 |
| 33,657 | McCormick | Nov. 5, 1861 |
| 33,681 | McCormick | Nov. 5, 1861 |
| 1,684,616 | Bicek | Sept. 18, 1928 |
| 2,687,000 | Valentine | Aug. 24, 1954 |